United States Patent
Jo

(10) Patent No.: US 11,933,887 B2
(45) Date of Patent: Mar. 19, 2024

(54) APPARATUS AND METHOD FOR CONTROLLING RADAR

(71) Applicant: HL Klemove Corp., Pyeongtaek (KR)

(72) Inventor: Kyung Tae Jo, Bucheon (KR)

(73) Assignee: HL KLEMOVE CORP., Incheon (KR)

( * ) Notice: Subject to any disclaimer, the term of this patent is extended or adjusted under 35 U.S.C. 154(b) by 263 days.

(21) Appl. No.: 17/187,603

(22) Filed: Feb. 26, 2021

(65) Prior Publication Data

US 2021/0270960 A1 Sep. 2, 2021

(30) Foreign Application Priority Data

Feb. 28, 2020 (KR) .......................... 10-2020-0024964

(51) Int. Cl.
*G01S 13/93* (2020.01)
*G01S 13/62* (2006.01)
*G01S 13/931* (2020.01)

(52) U.S. Cl.
CPC ............ *G01S 13/931* (2013.01); *G01S 13/62* (2013.01); *G01S 2013/9315* (2020.01); *G01S 2013/93274* (2020.01)

(58) Field of Classification Search
CPC ................... G01S 13/931; G01S 13/62; G01S 2013/9315; G01S 2013/93274; G01S 13/72; G01S 13/87; G01S 13/582
See application file for complete search history.

(56) References Cited

U.S. PATENT DOCUMENTS

| | | | | |
|---|---|---|---|---|
| 2004/0239509 | A1* | 12/2004 | Kisacanin | G08B 21/06 340/575 |
| 2005/0090950 | A1* | 4/2005 | Sawamoto | G08G 1/166 701/28 |
| 2017/0101092 | A1* | 4/2017 | Nguyen Van | B60W 30/095 |
| 2020/0079364 | A1* | 3/2020 | Min | B60W 30/18163 |

FOREIGN PATENT DOCUMENTS

| | | | |
|---|---|---|---|
| JP | 2011253241 A | * | 12/2011 |
| JP | 2012-159348 A | | 8/2012 |
| JP | 2015-225615 A | | 12/2015 |

OTHER PUBLICATIONS

Office Action dated Oct. 23, 2023 for counterpart Korean Patent Application No. 10-2020-0024964.

* cited by examiner

*Primary Examiner* — Bernarr E Gregory
*Assistant Examiner* — Juliana Cross
(74) *Attorney, Agent, or Firm* — Harvest IP Law, LLP

(57) ABSTRACT

According to the disclosure, a radar control device comprises a plurality of radars mounted to a vehicle, each of the plurality of radars having a different detection area outside the vehicle, and a controller generating object information for an object based on a radar signal reflected by the object within the detection area. When the object moves from the detection area of at least one of the plurality of radars to a shadow area between different detection areas, the controller generates prediction information for the object in the shadow area based on object information last detected in the detection area.

20 Claims, 12 Drawing Sheets ated to a vehicle, in which each of the plurality of radars has a different detection area, comprises generating object information for an object based on a radar signal reflected by the object within the detection area, and when the object moves from the detection area of at least one of the plurality of radars to a shadow area between different detection areas, generating prediction information for the object in the shadow area based on object information last detected in the detection area.

According to embodiments, there may be provided a radar control device and method that may control a vehicle considering the object moved from the detection area to the shadow area as prediction information for an object in a shadow area that may exist between the detection areas of a plurality of radars is generated.

According to embodiments, there may be provided a radar control device and method that may seamlessly and continuously generate object information for the object moving through the detection area and shadow area as object information for the object is generated based on prediction information for the object moving from the shadow area to the detection area.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
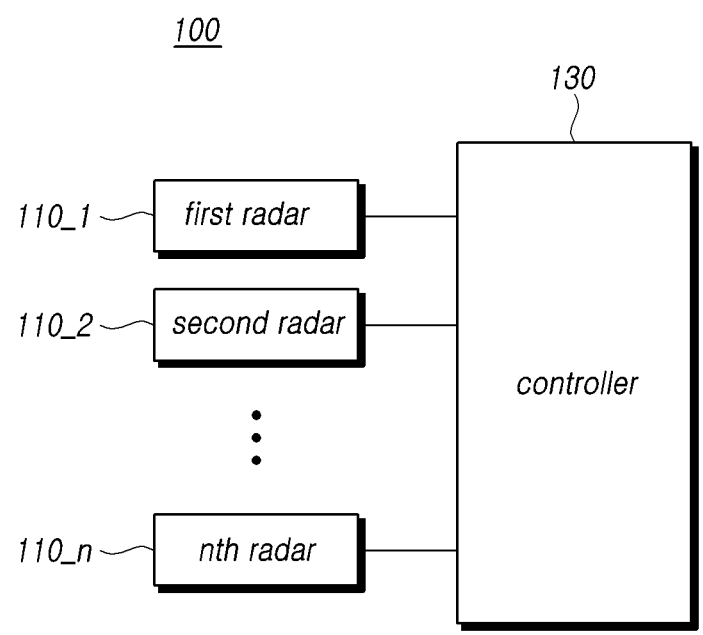
FIG. 1 is a block diagram illustrating a radar control device according to an embodiment of the disclosure.

In the following description of examples or embodiments of the disclosure, reference will be made to the accompanying drawings in which it is shown by way of illustration specific examples or embodiments that can be implemented,

APPARATUS AND METHOD FOR CONTROLLING RADAR

CROSS-REFERENCE TO RELATED APPLICATION

This application claims priority from Korean Patent Application No. 10-2020-0024964, filed on Feb. 28, 2020, which is hereby incorporated by reference for all purposes as if fully set forth herein.

BACKGROUND

Field

Embodiments of the disclosure relate to radar control devices and methods for detecting objects using a plurality of radars mounted to a vehicle.

Description of Related Art

Various devices for driving aids or autonomous driving have recently been commercialized and developed. According to these trends, radars mounted to a vehicle detect objects around the vehicle and provide information, aiding in driving.

Conventional radar systems use only information for the detection area of each radar in relation to designing and operating a vehicle control logic. Since the performance of the radar is supplemented/corrected using the limited information about the detection area, there may be a high chance of an error in monitoring and the monitoring performance may differ depending on beam angles.

As it becomes commonplace or mandatory to equip a radar system as an auxiliary device for developing an autonomous driving system, each vehicle comes with multiple radar systems for enhanced performance. Therefore, a need arises for a method for more accurately detecting objects by efficient use of multiple radar systems.

BRIEF SUMMARY

According to embodiments, there may be provided a radar control device and method that may control a vehicle considering the object moved from the detection area to the shadow area as prediction information for an object in a shadow area that may exist between the detection areas of a plurality of radars is generated.

According to embodiments, there may be provided a radar control device and method that may seamlessly and continuously generate object information for the object moving through the detection area and shadow area as object information for the object is generated based on prediction information for the object moving from the shadow area to the detection area.

According to an embodiment, a radar control device comprises a plurality of radars mounted to a vehicle, each of the plurality of radars having a different detection area outside the vehicle, and a controller generating object information for an object based on a radar signal reflected by the object within the detection area. When the object moves from the detection area of at least one of the plurality of radars to a shadow area between different detection areas, the controller generates prediction information for the object in the shadow area based on object information last detected in the detection area.

According to an embodiment, a radar control method for controlling a plurality of radars mount and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear.

The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompass all the meanings of the term "can".

As used herein, "detection area" refers to an area or region in which an object may be detected via each radar mounted to a vehicle and information for the object may be obtained. As used herein, "shadow area" refers to an area or region in which an object is not effectively detected by a radar mounted to a vehicle within a predetermined range of the vehicle. As used herein, "duplicate detection" refers to detection of an object in a region in which the detection areas of at least two or more radars overlap. As used herein, "first radar" refers to a radar corresponding to a detection area in which an object is detected before moving to another detection area, and "second radar" refers to a radar corresponding to the other detection area to which the object moves. As used herein, "handover" means that, when an object moves from one detection area to another, information for the object, detected by a radar before the movement is used for the radar to detect the object after the movement so that detection of the object maintains continuity.

Hereinafter, various embodiments of a radar control device and method are described with reference to the accompanying drawings.

FIG. 1 is a block diagram illustrating a radar control device according to an embodiment of the disclosure.

Referring to FIG. 1, a radar control device 100 according to the disclosure includes a plurality of radars 110 mounted to a vehicle to have different detection areas outside the vehicle and a controller 130 generating object information for objects based on radar signals reflected by the objects in the detection areas.

Each of the plurality of radars 110 may be mounted to a different part of the vehicle. For example, each of n radars 110_1, 110_2, . . . 110_n may be arranged to have different detection areas. Here, n is any natural number. For example, when n is 4, four radars may be disposed on the front left, front right, rear left, and rear right side, respectively, of the vehicle. Further, the transmission and reception of radar signals may be set so that the four radars have a detection area covering the front left side, a detection area covering the front right side, a detection area covering the rear left side, and a detection area covering the rear right side.

The following description focuses primarily on an example in which four radars are provided, but embodiments of the disclosure are not limited thereto. For example, n, which is the number of radars mounted to the vehicle, may differ depending on cases, and the following description may be applied in substantially the same manner regardless of n, unless contradictory to the technical spirit of the disclosure.

Each of the plurality of radars 110 may transmit a radar signal within the detection area, detect the radar signal reflected by an object, and provide such information as, e.g., the distance to the object around the vehicle, on a per-frame basis. The radar 110 may process data by analyzing the transmitted radar signal and the detected radar signal. By such data processing, the radar 110 may detect information for the object. For such processing, the radar 110 may include an electronic control unit (ECU) or a processor. Data transmission or signal communication from the radar sensor to the ECU may use a communication link, such as a suitable vehicle network bus.

The controller 130 may control the overall operation of the radar control device 100. According to an example, the controller 130 may be implemented as a micro control unit (MCU) or an electronic control unit (ECU). When the object moves from at least one detection area among the plurality of radars to a shadow area between detection areas, the controller 130 may generate prediction information for the object in the shadow area based on the last object information detected in the detection area.

When an object, such as another vehicle, enters at least one of the detection areas of the plurality of radars 110, the controller 130 may receive a radar signal detected from the radar 110 corresponding to the detection area entered by the object. According to an example, the controller 130 may receive a radar signal that has undergone signal processing, such as noise removal, signal amplification, analog-to-digital conversion, and fast Fourier transform (FFT) in the radar 110, and generate object information for the object. Alternatively, the controller 130 may receive object information generated through the aforementioned signal processing in the radar 110.

According to an example, the object information may include information, such as a distance and angle from the vehicle to the object, the speed of the object, or the width or length of the object. The controller 130 may track the movement of the object within the detection area based on the position and movement of the detected object. As long as the movement of the object may be tracked based on the detected object information, the object tracking method is not limited to a specific method.

The controller 130 may determine whether the object detected in the detection area of at least one of the plurality of radars moves to a shadow area between the detection areas. For example, when the object detected in the detection area moves outside the detection area, the controller 130 may determine whether the area to which the object has moved is the detection area of another radar or a shadow area between the detection areas.

To that end, according to an example, information for each detection area of the vehicle may be previously stored when the radars are mounted. In other words, such information as the size, position, and shape of the detection area around the vehicle may be stored in advance. Alternatively, the information for the detection area may be obtained and stored based on the last information detected on the object moving out of the detection area.

When the object moves from the detection area to the shadow area, the controller 130 may store the detection time when the object was last detected in the detection area and the object information in a predetermined memory. The controller 130 may generate prediction information for the object in the shadow area based on the last object information stored. According to an example, the prediction information may include distance, angle, and speed information for the object in the shadow area. For example, the controller 130 may predict position and speed information for the object that has moved to the shadow area based on the position and speed information for the object last detected.

In this case, according to an example, the object information for the object tracked within the detection area may be further used to generate the prediction information. In other words, the controller 130 may predict the movement of the object in the shadow area considering, e.g., the driving direction of the object based on the continuous movement of the object in the detection area and the last detected movement.

Further, according to an example, the controller 130 may variously predict prediction information for the object depending on the driving direction or speed of the object. For example, the controller 130 may generate prediction information by prioritizing the case where the driving direction or speed of the object last detected is maintained. Thereafter, the controller 130 may generate prediction information by taking the case where the speed of the object increases or the case where the driving direction of the object approaches the vehicle as the next priority. In this case, the prediction ranking may be set based on a probability of the object colliding with the vehicle as one criterion.

The controller 130 may control the vehicle based on the prediction information generated while the object is in the shadow area. The controller 130 may transmit the generated prediction information to the vehicle control system. If the controller 130 is included in the vehicle control system, the controller 130 may generate and output a vehicle control command based on the prediction information. For example, if the object is predicted to move through the shadow area in a direction in which it may collide with the vehicle, the vehicle control system may generate a vehicle control command, such as avoidance driving, based on the prediction information.

The controller 130 may predict a detection area into which the object will enter based on the prediction information. When the object moves from the shadow area to one of the detection areas, the controller 130 may generate object information for the object based on the last prediction information generated for the shadow area. When the object is detected in the predicted position, the controller 130 may compare object information for the detected object with object information detected in a previous detection area. As a result of the comparison, when it is determined that the object is the same, the controller 130 may obtain object information in the new detection area in association with the object information obtained in the previous detection area and the shadow area. Accordingly, even when the object moves around the vehicle through the shadow area between the detection areas, information for the movement of the object may be seamlessly and continuously obtained.

According to an example, to predict the movement of the object in the shadow area, driving information for the object may be continuously stored from the moment when the object is first detected. The controller 130 may analyze the driving pattern of the object from the stored driving information for the object. The controller 130 may further apply an analyzed driving pattern in predicting the movement of the object in the shadow area.

The storage of the driving information and the analysis of the driving pattern, each, may be performed when the object is detected for a predetermined time. The storage of driving information and analysis of driving pattern may be terminated when a predetermined time elapses after the corresponding object is finally detected.

As such, as prediction information for an object in a shadow area that may exist between the detection areas of a plurality of radars is generated, the vehicle may be controlled considering the object moved from the detection area to the shadow area. Further, as object information for the object is generated based on prediction information for the object moving from the shadow area to the detection area, object information may be seamlessly and continuously generated for the object moving through the detection area and shadow area.

Figure 2:
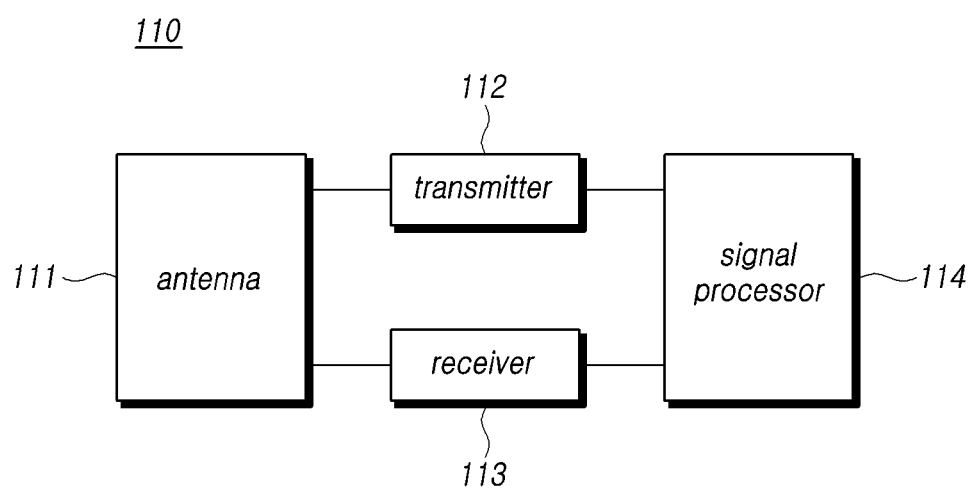
FIG. 2 is a block diagram illustrating a radar according to an embodiment of the disclosure.

FIG. 2 is a block diagram illustrating a radar according to an embodiment of the disclosure.

Referring to FIG. 2, each of a plurality of radars 110 mounted to a vehicle may include an antenna 111, a transmitter 112 that generates and transmits a radar signal through the antenna, a receiver 113 that receives the radar signal reflected by an object through the antenna, and a signal processor 114 that processes the received radar signal.

The antenna 111 may include at least one transmit antenna and at least one receive antenna. According to an example, the transmit antenna and the receive antenna may be implemented as an array antenna. However, this is merely an example, and embodiments of the disclosure are not limited thereto. The antenna 11 is not limited to a specific one as long as it may be installed at a vehicle to be able to transmit or receive transmission signals.

The transmitter 112 may generate a radar signal that is transmitted through the antenna. According to one example, the transmitter 112 may include a means for generating chirp signals that are transmitted, reflected, and received by the antenna. The chirp signal may be a frequency modulated continuous wave (FMCW) signal having a specific amplitude.

The receiver 113 may receive, through the antenna, and process radar signals. For example, the receiver 113 may include, e.g., an analog-digital converter (ADC) for converting the received radar signal into a baseband signal, amplifying the baseband signal, and converting the same into a digital signal.

The signal processor 114 may be implemented as a micro control unit (MCU), according to an example. The signal processor 114 may simultaneously sample and analyze the phase and amplitude of the received radar signals using the digitally converted signal and calculate, e.g., the azimuth angle of the object. The analysis may be performed by a fast Fourier transform (FFT) in a digital signal processor (DPS). In this case, the signal processor 114 may be used as a concept including a digital signal processor.

Although a configuration of the radar 110 has been described above, this is merely an example, and embodiments of the disclosure are not limited thereto. The radar 110 is not limited to a specific type as long as the disclosure is applicable, and the radar 110 may further include other components than those described in connection with FIG. 2. Further, the operation of each component of the radar 110 may be set to differ depending on cases if the disclosure is applicable.

The operation of the radar control device 100 is described below in more detail with reference to the related drawings.

Figure 3:
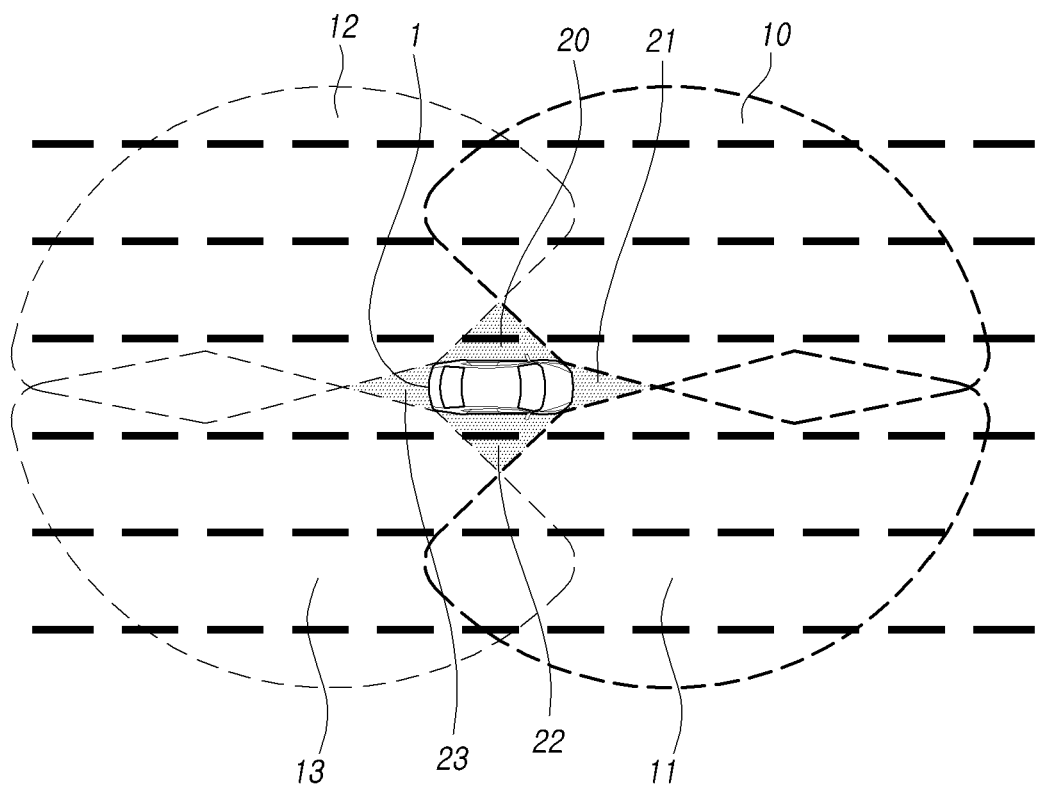
FIGS. 3 and 4 are views illustrating an example of obtaining object information for an object according to a detection area and shadow area of each of a plurality of radars, according to an embodiment of the disclosure.
Figure 4:
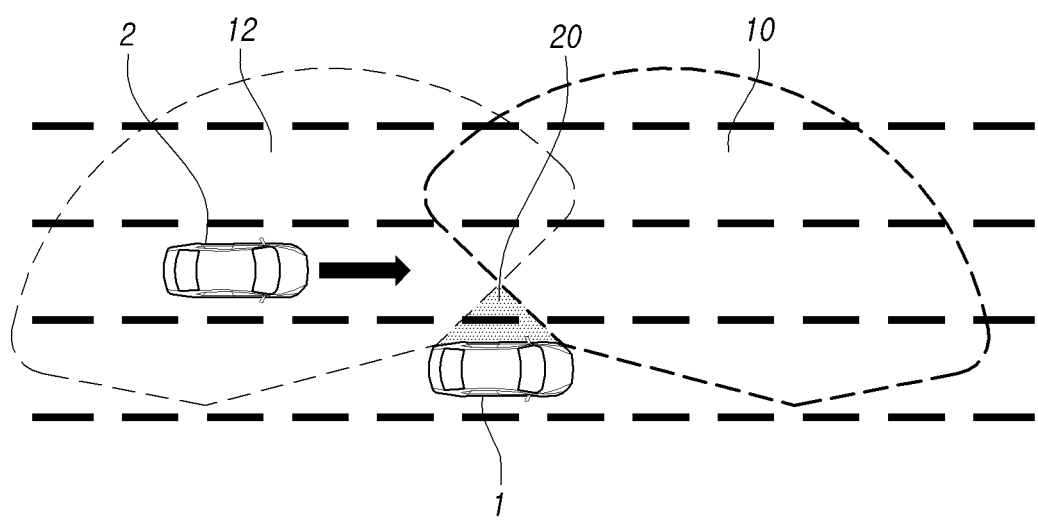

FIGS. 3 and 4 are views illustrating an example of obtaining object information for an object according to a detection area and shadow area of each of a plurality of radars, according to an embodiment of the disclosure;

FIG. 3 illustrates an example in which detection areas 10, 11, 12, and 13 are formed around a vehicle 1 by four radars. For example, the vehicle 1 may have four radars corresponding to a detection area 10 covering a front left side, a detection area 11 covering a front right side, a detection area 12 covering a rear left side, and a detection area covering a rear right side. Each radar has a predetermined detection area, and the detection areas may overlap each other.

However, this is merely an example for convenience of description, and the number of radars and the shape of the detection area are not limited thereto. For example, different detection areas may be formed depending on the number of radars mounted to the vehicle and the mounting position and angle of the radars. Accordingly, different shadow areas may be formed between the detection areas. The description herein may be applied in substantially the same manner regardless of the shape of the detection area and the shadow area unless contradictory to the technical spirit of the disclosure.

As illustrated in FIG. 3, shadow areas 20, 21, 22, and 23 may exist between the detection areas. The shadow area is an area in which an object is not effectively detected according to the characteristics of the signal transmitted from a radar. For example, an area in which the strength of the receive signal reflected by the object is less than a predetermined threshold may be a shadow area. However, this is an example, and embodiments of the disclosure are not limited thereto. Any area in which an object is not effectively detected between detection areas may be a shadow area regardless of why it is formed.

As illustrated in FIG. 4, the vehicle 1 is approached by an object 2, which is another vehicle, from its rear left side. When the object 2 enters the detection area 12 covering the rear left side, the controller 130 may generate object information for the object 2 based on the radar signal received from the radar corresponding to the detection area 12.

The controller 130 may track the movement of the object 2 in the detection area 12 based on object information including, e.g., the distance and angle between the vehicle 1 and the object 2, the speed of the object, or the area or length of the object. The controller 130 may control the vehicle based on the object information obtained while the object is in the detection area 12. The controller 130 may transmit the generated object information to the vehicle control system. If the controller 130 is included in the vehicle control system, the controller 130 may generate and output a vehicle control command based on the object information.

The controller 130 may generate prediction information for the object in the shadow area based on the last object information stored. According to an example, the object information for the object tracked within the detection area may be further used to generate the prediction information. In other words, the controller 130 may predict the movement of the object in the shadow area based on the continuous movement of the object in the detection area and the last detected movement.

For example, as illustrated in FIG. 4, it is assumed that the object 2 accelerates and passes the vehicle 1 on the left. In this case, the object 2 leaves the detection area 12 and enters the shadow area 20. The controller 130 may identify that the object 2 moves from the detection area 12 to the shadow area 20 based on the object information obtained from the detection area 12. In other words, the controller 130 may determine that the object 2 passes the vehicle 1 on the left based on the movement information for the object.

When the object 2 moves from the detection area 12 to the shadow area 20, the controller 130 may store the last object information detected at the moment when the object 2 leaves the detection area 12, along with the detection time, in a predetermined memory. The controller 130 may generate prediction information for the object in the shadow area based on the last object information stored. According to an example, the prediction information may include distance, angle, and speed information for the object in the shadow area.

According to an example, the object information for the object 2 tracked within the detection area may be further used to generate the prediction information. For example, the controller 130 may predict the movement of the object 2 in the shadow area 20 based on the continuous movement and last detected movement of the object 2 in the detection area 12. For example, the movement of the object 2 in the shadow area 20 may be predicted based on information, such as a movement direction or acceleration of the object 2 obtained in the detection area 12. In other words, when the movement direction and acceleration pattern of the object last detected are maintained, the movement the object 2 in the shadow area 20 may be predicted. The controller 130 may generate prediction information for the object 2 according to a predetermined cycle or continuously while the object 2 is in the shadow area 20. The controller 130 may control the vehicle 1 based on the generated prediction information. The controller 130 may transmit the generated prediction information to the vehicle control system. If the controller 130 is included in the vehicle control system, the controller 130 may generate and output a vehicle control command based on the prediction information.

Referring back to FIG. 4, the object 2 may continue to accelerate and exit the shadow area 20 and enter the detection area 10 covering the front left side. The controller 130 may predict a detection area into which the object will enter based on the prediction information. When the object moves from the shadow area to one of the detection areas, the controller 130 may generate object information for the object based on the last prediction information generated for the shadow area.

The controller 130 may predict that the object 2 moves from the shadow area 20 to the detection area 10 based on the prediction information. When the object 2 is detected in the predicted position of the detection area 10, the controller 130 may compare object information for the detected object with the object information detected in the previous detection area 12 to thereby determine whether they are identical.

When they are determined to be the same object, the controller 130 may obtain object information for the object 2 in the new detection area 10 in association with the object information obtained in the previous detection area 12 and the prediction information obtained in the shadow area 10. Thus, when the object moves through the detection area and the shadow area around the vehicle, the movement of the object may be seamlessly and continuously obtained.

Therefore, it is possible to seamlessly and continuously generate object information for the object moving through the detection area and the shadow area by generating prediction information for the object in the shadow area that may exist between the detection areas of the plurality of radars and generating object information based on the prediction information for the object moving from the shadow area to the detection area.

Figure 5:
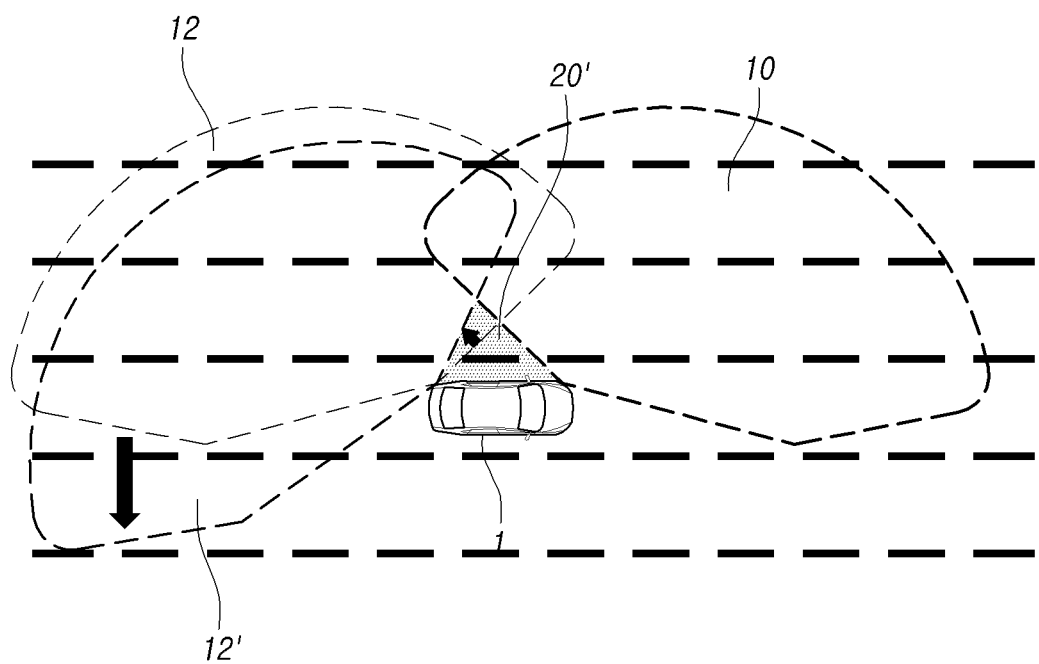
FIG. 5 is a view illustrating operations when a detection area of a radar is changed, according to an embodiment of the disclosure.

FIG. 5 is a view illustrating operations when a detection area of a radar is changed, according to an embodiment of the disclosure;

According to an example, information for each detection area around the vehicle 1 may be stored when the radar is mounted. In other words, such information as the size or shape of the detection area around the vehicle 1 may be stored in advance. Or, the information for the detection area may be obtained based on the last information detected on the object moving out of the detection area.

According to an example, the controller 130 may generate a prediction data table for each shadow area based on prediction information generated in each shadow area. In this case, the controller 130 may use information for the detection area when generating the prediction data table. The controller 130 may generate the prediction data table by accumulating prediction information for the object in the shadow area. The prediction data table may include prediction data based on the distance, angle, or speed in the shadow area. In other words, the prediction information that may be predicted for the object in the shadow area based on movement information for the objects moving from the detection area to the shadow area may be generated as a prediction data table.

Upon generating prediction information for the object in the shadow area, the controller 130 may correct the generated prediction information by referring to the prediction data table. Further, when the object moves from the shadow area to the detection area, the controller 130 may identify whether the object is detected at a predicted time or in a predicted position and update the prediction data table according to the result. For example, if the detected time or position when moving back to the shadow area is not included within a predicted range, the controller 130 may update the predicted data table based on the result.

According to an example, when the detection area of at least one of the plurality of radars is changed, the controller 130 may update the prediction data table based on the last object information detected in the changed detection area. FIG. 5 illustrates an example in which the detection area 12 covering the rear left side of the vehicle 1 is changed to the detection area 12'. For example, the change of the detection area may occur due to a change in the mounting angle of the radar by an external impact or an operation for changing the direction of the radar. However, this is an example, and embodiments of the disclosure are not limited by the cause of the change.

The controller 130 may identify the change of the detection area according to the object information detected in the changed detection area 12'. For example, the controller 130 may identify a change in, e.g., the distance, angle, or time of the detection area from such information as the last detected position of the object leaving the detection area 12'. When values deviating from the standard deviation are continuously detected may be the case.

The controller 130 may identify the shadow area 20' changed by the change of the detection area 12'. As illustrated in FIG. 5, the shadow area 20 may be changed to a larger shadow area 20' by the changed detection area 12'. Accordingly, the controller 130 may update the prediction data table considering the changed shadow area 20'. Even in this case, the controller 130 may identify whether the object is detected at the time or position predicted when moving from the shadow area 20' to the detection area and update the prediction data table according to the result.

According to an example, when the detection area of at least one of the plurality of radars is changed, the controller 130 may control the output device to output information for the changed detection area. In other words, in the case where prediction information is generated based on the previous shadow area and the vehicle is accordingly controlled even when the shadow area has been changed, the controller 130 may output information for allowing the driver to notice it.

The output device may be implemented as a display, an acoustic device, or a haptic module for visually, aurally or tactilely outputting the corresponding information to the driver, but is not limited to a specific type.

According to this, prediction information may stably be generated by identifying the change of the shadow area according to the changed detection area and accordingly updating the prediction data table.

Figure 6:
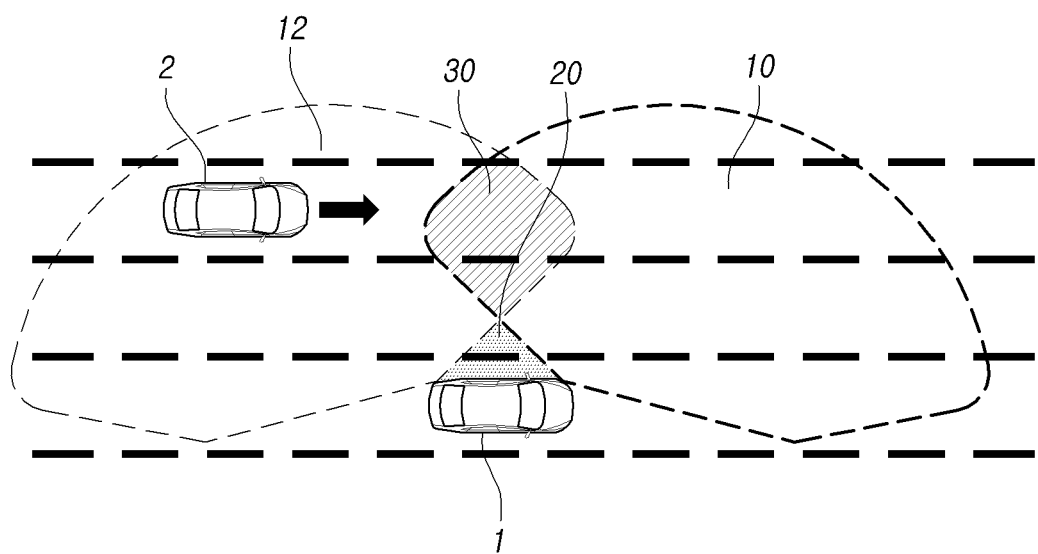
FIG. 6 is a view illustrating an example of obtaining object information for an object that moves through detection areas of two radars, according to an embodiment of the disclosure.

FIG. 6 is a view illustrating an example of obtaining object information for an object that moves through detection areas of two radars, according to an embodiment of the disclosure;

Referring to FIG. 6, an object 2 may move to the overlapping area 30 of a detection area and another detection area 12. In this case, the object 2 may be detected by two radars corresponding to the detection area 10 and the detection area 12, respectively. In this case, the controller 130 may integrate the two pieces of object information for the object detected by the two radars into one.

The controller 130 may compare the two pieces of object information, such as the positions or sizes of the object of the detected object, thereby determining whether duplicate detection has been performed. If the two pieces of object information obtained through the two radars are the same, the controller 130 may determine that duplicate detection has been performed on the same object. The case where the two pieces of object information are the same may encompass when a difference between the two pieces of object information detected by the radars falls within a predetermined error range.

If it is determined that duplicate detection has been performed on the object, the controller 130 may integrate the pieces of object information into one and process the same. In other words, the data items for the same object may be processed, integrated into one, but not individually.

Unlike described above, the controller 130 may alternatively remove one of the duplicate pieces of object information detected according to a predetermined condition. For example, the predetermined condition may be determined based on the strength of the received radar signals. In other words, the controller 130 may be configured to use only object information according to the received radar signal received with the higher strength. However, this is merely an example, and embodiments of the disclosure are not limited thereto.

According to an example, as the vehicle, or the object, e.g., another vehicle, moves, the position of the object may change from one detection area to another. In this case, when the object moves from the detection area of a first radar of the plurality of radars to the detection area of a second radar, the controller 130 may control to hand over information for the object between the first radar and the second radar.

For continuous object detection, the controller 130 may detect the object from the second radar using object information detected by the first radar. When the object moves outside the detection area of the first radar, the controller 130 may predict to enter the detection area of the second radar according to the movement and movement path of the object.

When the object is detected in the predicted position, the controller 130 may compare the object information with the object information detected in a previous detection area. As a result of the comparison, if the pieces of object information are the same, the controller 130 may perform object detection in the new detection area in association with the object information obtained in the previous detection area. Accordingly, the movement of the object around the vehicle may be seamlessly and continuously obtained.

Figure 7:
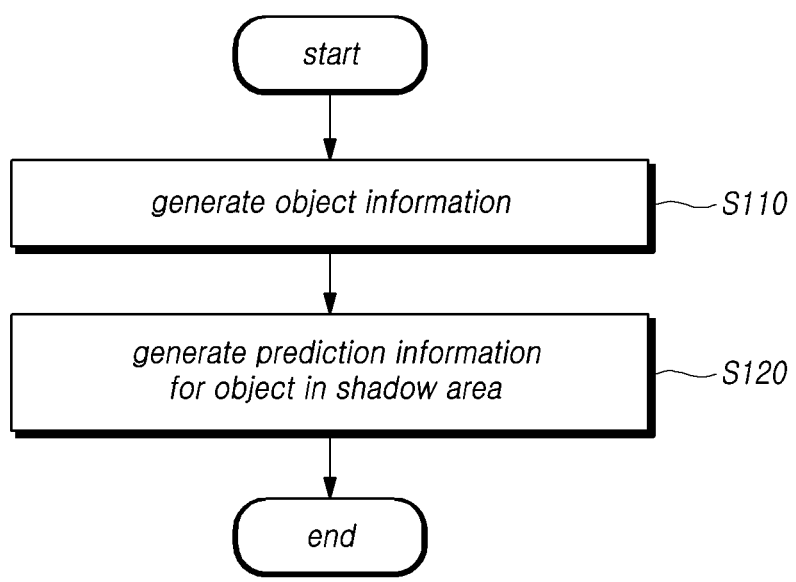
FIG. 7 is a flowchart illustrating a radar control method according to an embodiment of the disclosure.
Figure 8:
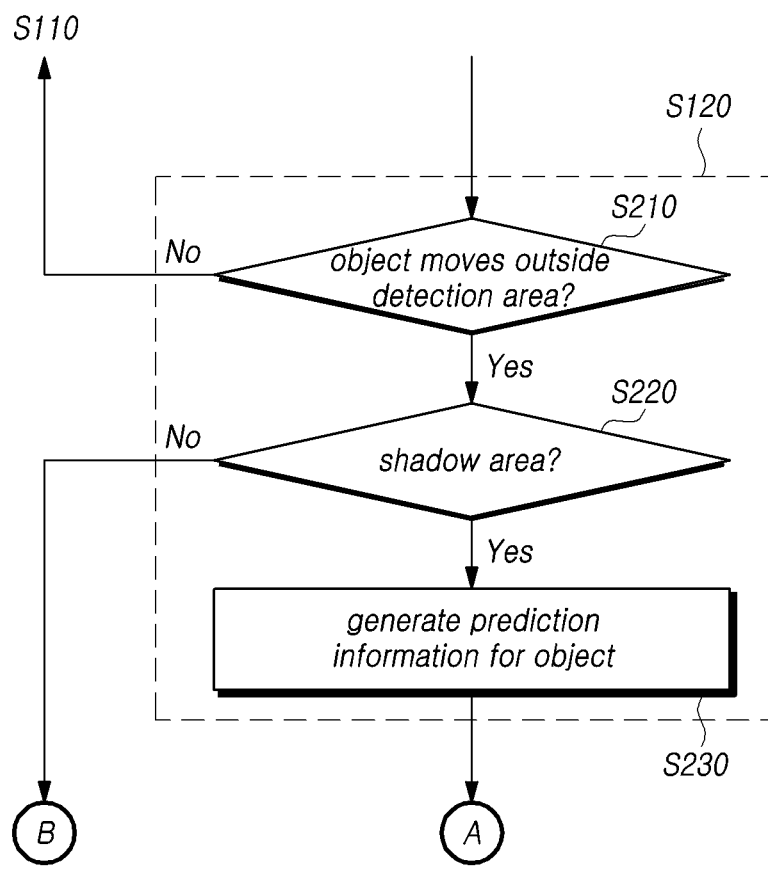
FIGS. 8 and 9 are flowcharts illustrating operations when an object moves through a detection area and a shadow area according to an embodiment of the disclosure.
Figure 9:
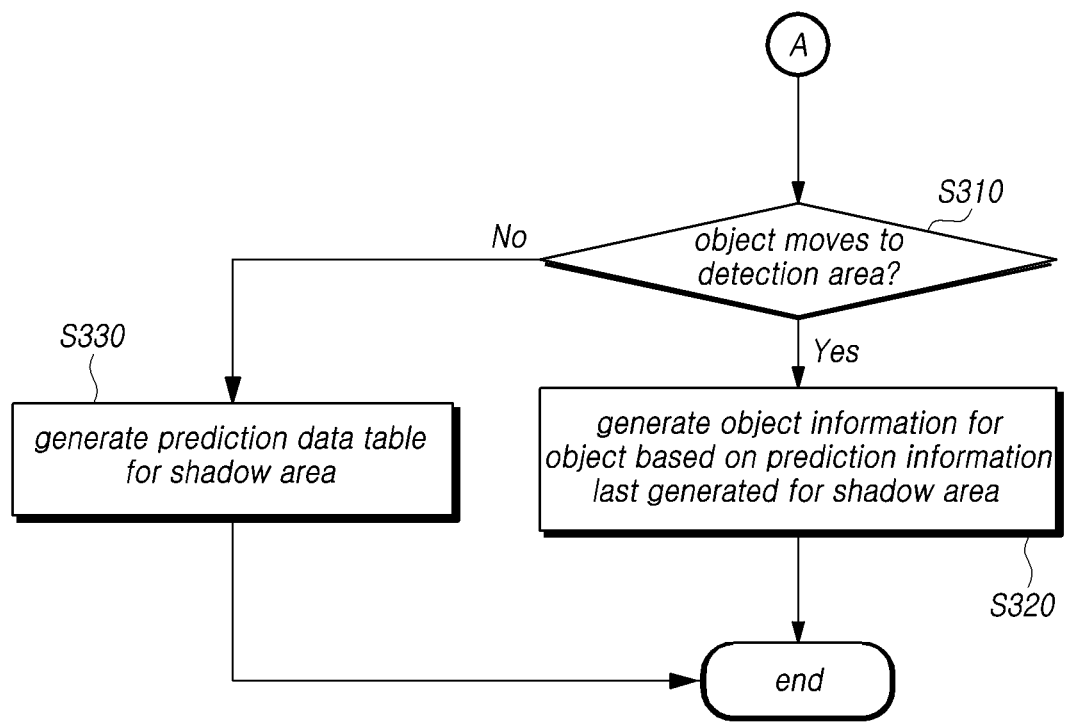

FIG. 7 is a flowchart illustrating a radar control method according to an embodiment of the disclosure. FIGS. 8 and 9 are flowcharts illustrating operations when an object moves through a detection area and a shadow area according to an embodiment of the disclosure;

According to the disclosure, a radar control method may be implemented in the radar control device 100 described above with reference to FIG. 1. A radar control method and operations of a radar control device 100 for implementing the same are described below in detail with reference to necessary drawings, according to the disclosure.

Referring to FIG. 7, the radar control device may generate object information for an object based on a radar signal reflected by the object in a detection area [S110].

When the object, e.g., another vehicle, enters the detection area of the radar, the radar control device may receive a radar signal from the radar corresponding to the detection area entered by the object. The radar control device may generate object information for the object based on the received radar signal. According to an example, the object information may include information, such as a distance and angle from the vehicle to the object, the speed of the object, or the width or length of the object.

The radar control device may track the movement of the object within the detection area based on the position and movement of the detected object.

Referring back to FIG. 7, when the object moves from at least one detection area among the plurality of radars to a shadow area between different detection areas, the radar control device may generate prediction information for the object in the shadow area based on the last object information detected in the detection area [S120].

The radar control device may determine whether the object detected in the detection area of at least one of the plurality of radars moves to a shadow area between the detection areas. When the object moves from the detection area to the shadow area, the radar control device may store the detection time when the object was last detected in the detection area and the object information in a predetermined memory. The radar control device may generate prediction information for the object in the shadow area based on the last object information stored. According to an example, the prediction information may include distance, angle, and speed information for the object in the shadow area.

The radar control device may control the vehicle based on the prediction information generated while the object is in the shadow area. For example, the radar control device may transmit the generated prediction information to the vehicle control system.

The radar control device may predict a detection area into which the object will enter based on the prediction information. When the object moves from the shadow area to one of the detection areas, the radar control device may generate object information for the object based on the last prediction information generated for the shadow area. Thus, when the object moves through the detection area and the shadow area around the vehicle, the movement of the object may be seamlessly and continuously obtained.

Referring to FIG. 8, the radar control device may determine whether the object leaves the detection area based on the object information obtained in the detection area [S210]. If the object is continuously detected within the detection area (No in S210), the radar control device may return to step S110, continuously generating object information for the object.

If the object leaves the detection area (Yes in S210), the radar control device may determine whether the object moves to the shadow area [S220]. The radar control device may determine whether the object moves to the shadow area based on the object information and information for the detection area.

When the object moves to the shadow area (Yes in S220), the radar control device may store the detection time when the object was last detected in the detection area and the object information in a predetermined memory. Further, the radar control device may generate prediction information for the object in the shadow area based on the last object information stored [S230].

According to an example, the object information for the object tracked within the detection area may be further used to generate the prediction information. In other words, the radar control device may predict the movement of the object in the shadow area based on the continuous movement of the object in the detection area and the last detected movement. For example, the movement of the object in the shadow area may be predicted based on information, such as the movement direction or acceleration of the object, obtained in the detection area.

The radar control device may generate prediction information about the object according to a predetermined cycle or continuously while the object is in the shadow area. The radar control device may control the vehicle based on the generated prediction information.

Subsequently, referring to FIG. 9, the radar control device may determine whether the object leaves the shadow area and enters the detection area [S310].

When the object does not move to the detection area (No in S310), the radar control device may generate a prediction data table for each shadow area based on the prediction information generated in each shadow area. In this case, the radar control device may use information for the detection area when generating the prediction data table. The radar control device may generate the prediction data table by accumulating prediction information for the object in the shadow area. The prediction data table may include prediction data for each angle or for each distance in the shadow area.

Upon generating prediction information for the object in the shadow area, the radar control device may correct the generated prediction information by referring to the prediction data table. Further, when the object moves from the shadow area to the detection area, the radar control device may identify whether the object is detected at a predicted time or in a predicted position and update the prediction data table according to the result.

When the object moves to the detection area (Yes in S310), the radar control device may predict the detection area entered by the object based on the prediction information. When the object moves from the shadow area to one of the detection areas, the radar control device may generate object information for the object based on the last prediction information generated for the shadow area [S320].

The radar control device may predict that the object moves from the shadow area to the detection area based on the prediction information. When the object is detected in the predicted position of the detection area, the radar control device may compare object information for the detected object with the object information detected in the previous detection area to thereby determine whether they are identical.

When it is determined that they are the same object, the radar control device may obtain object information for the object in the new detection area in association with the object information obtained in the detection area and the prediction information obtained in the shadow area. Thus, when the object moves through the detection area and the shadow area around the vehicle, the movement of the object may be seamlessly and continuously obtained.

Figure 10:
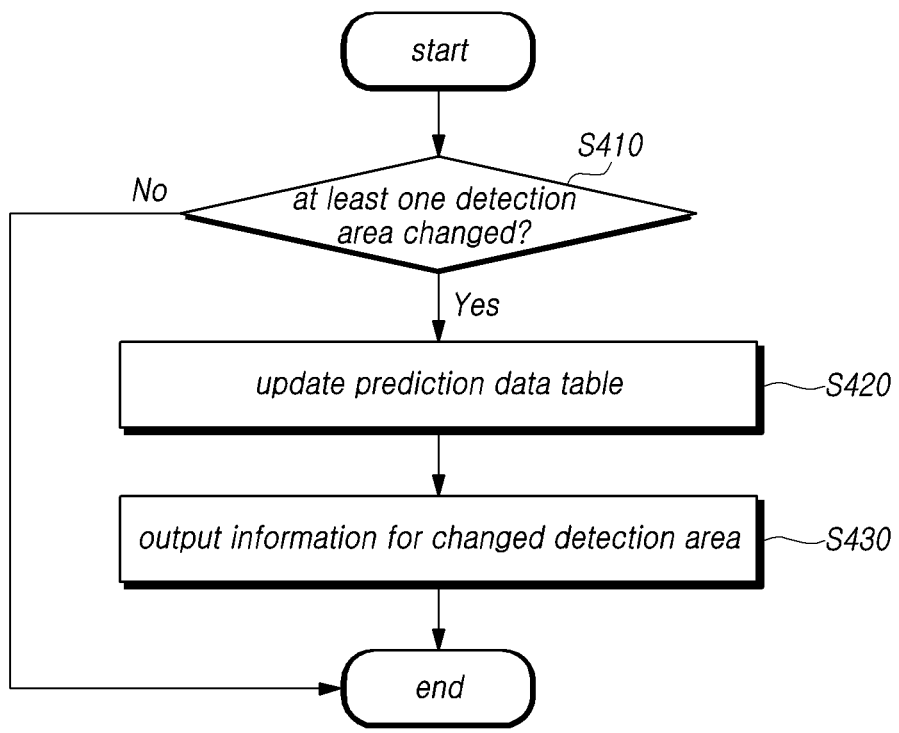
FIG. 10 is a flowchart illustrating operations when a detection area of a radar is changed, according to an embodiment of the disclosure.

FIG. 10 is a flowchart illustrating operations when a detection area of a radar is changed, according to an embodiment of the disclosure;

The radar control device may determine whether the detection area of at least one of a plurality of radars is changed [S410]. When the detection area is changed (Yes in S410), the radar control device may update the prediction data table based on the object information last detected in the changed detection area [S420].

The radar control device may identify the change of the detection area according to the object information detected in the changed detection area. For example, the radar control device may identify a change in, e.g., the distance, angle, or time of the detection area from such information as the last detected position of the object leaving the detection area. When values deviating from the standard deviation are continuously detected may be the case.

The radar control device may identify the change of the shadow area due to the change of the detection area. The radar control device may update the prediction data table considering the changed shadow area.

The radar control device may control the output device to output information for the changed detection area [S430]. In other words, in the case where prediction information is generated based on the previous shadow area and the vehicle is accordingly controlled even when the shadow area has been changed, the radar control device may output information for allowing the driver to notice it.

According to this, prediction information may stably be generated by identifying the change of the shadow area according to the changed detection area and accordingly updating the prediction data table.

Figure 11:
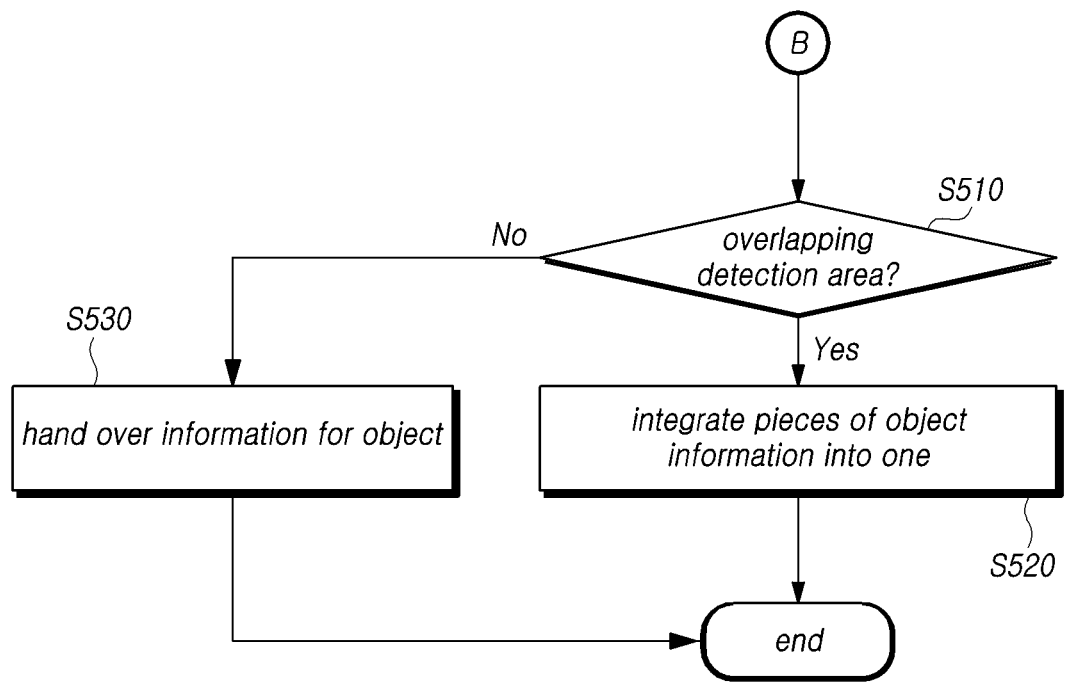
FIG. 11 is a flowchart illustrating an operation of generating object information for an object moving between detection areas according to an embodiment of the disclosure.

FIG. 11 is a flowchart illustrating an operation of generating object information for an object moving between detection areas according to an embodiment of the disclosure; and Referring back to FIG. 8, it is hypothesized that the outside of the detection area left by the object is not a shadow area (No in S220). Referring to FIG. 11, the radar control device may determine whether the object moves to the overlapping area of a detection area and another detection area [S510]. When the object moves to the overlapping area (Yes in S510), the object may be detected by each of two radars corresponding to the two detection areas. In this case, the radar control device may integrate the two pieces of object information for the object detected by the two radars into one.

The radar control device may compare the pieces of object information, such as the positions or sizes of the detected object and, if the pieces of object information are the same, the radar control device may determine that duplicate detection has been performed on the same object. If it is determined that duplicate detection has been performed on the object, the radar control device may integrate the pieces of object information into one and process the same. In other words, the data items for the same object may be processed, integrated into one, but not individually.

Unlike described above, the radar control device may remove one of the duplicate pieces of object information detected according to a predetermined condition. For example, the predetermined condition may be determined based on the strength of the received radar signals.

In other words, the radar control device may be configured to use only object information according to the received radar signal received with the higher strength. However, this is merely an example, and embodiments of the disclosure are not limited thereto.

When the object does not move to the overlapping area (No in S510), it may be the case that the object moves from one detection area to another detection area. In this case, when the object moves from the detection area of a first radar of the plurality of radars to the detection area of a second radar, the radar control device may control to hand over information for the object between the first radar and the second radar [S530].

For continuous object detection, the radar control device may detect the object from the second radar using object information detected by the first radar. When the object moves outside the detection area of the first radar, the radar control device may predict to enter the detection area of the second radar according to the movement and movement path of the object.

When the object is detected in the predicted position, the radar control device may compare the object information with the object information detected in a previous detection area. As a result of the comparison, if the pieces of object information are the same, the radar control device may perform object detection in the new detection area in association with the object information obtained in the previous detection area.

Accordingly, the movement of the object around the vehicle may be seamlessly and continuously obtained.

Figure 12:
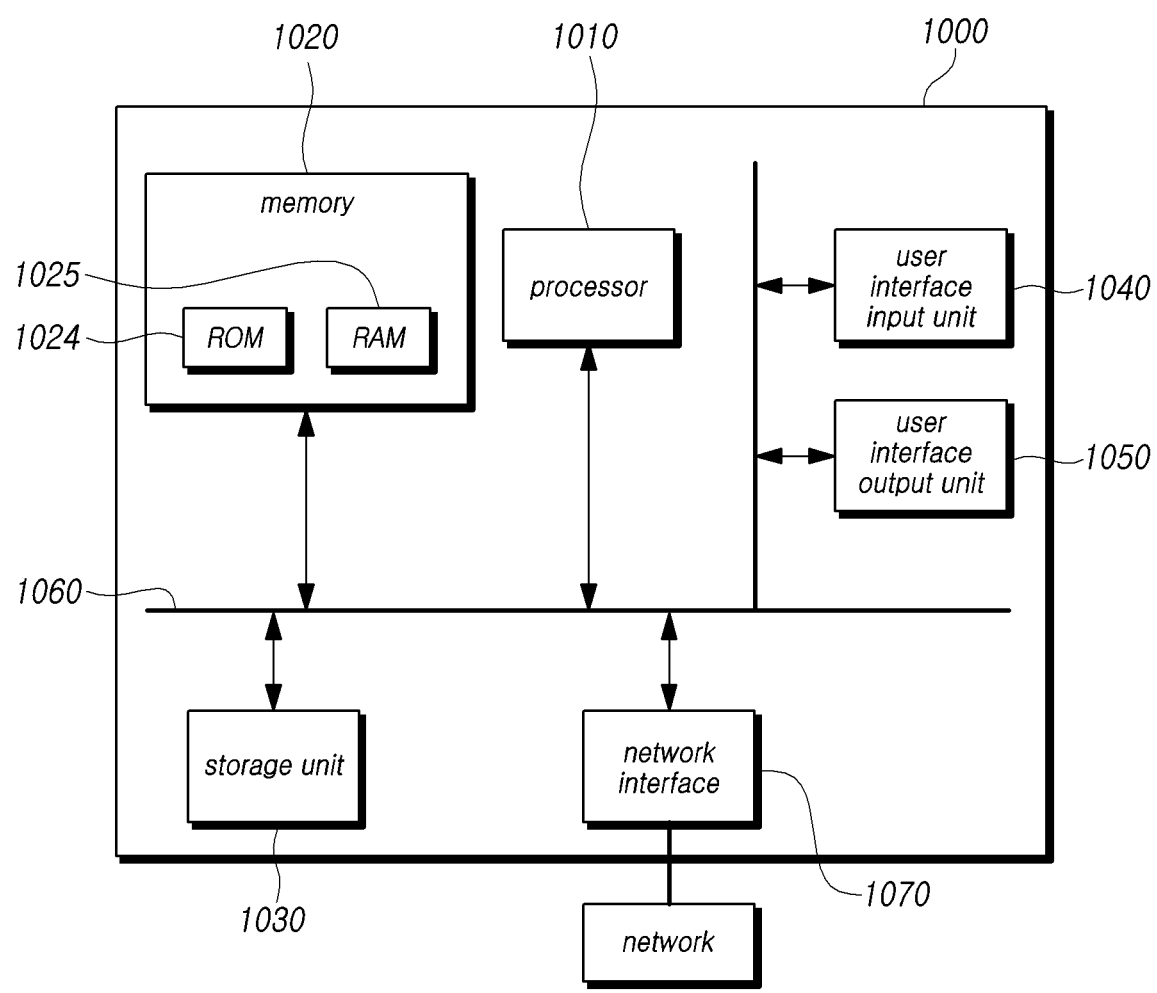
FIG. 12 is a block diagram illustrating configuration of a computer system of a radar control device according to an embodiment of the disclosure.

FIG. 12 is a block diagram illustrating configuration of a computer system of a radar control device according to an embodiment of the disclosure.

Referring to FIG. 12, the above-described embodiments may be implemented as, e.g., a computer-readable recording medium, in a computer system. As illustrated in the drawings, the computer system 1000 of the radar control device may include at least one of one or more processors 1010, a memory 1020, a storage unit 1030, a user interface input unit 1040, and a user interface output unit 1050 which may communicate with each other via a bus 1060. The computer system 1000 may further include a network interface 1070 for connecting to a network. The processor 1010 may be a central processing unit (CPU) or semiconductor device that executes processing instructions stored in the memory 1020 and/or the storage unit 1030. The memory 1020 and the storage unit 1030 may include various types of volatile/non-volatile storage media. For example, the memory 1200 may include a read only memory (ROM) 1021 and a random access memory (RAM) 1023.

Accordingly, the embodiments may be implemented as a non-volatile computer recording medium storing computer-implemented methods or computer executable instructions. The instructions may be executed by the processor to perform a method according to an embodiment of the disclosure.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A radar control device, comprising:
    a plurality of radars mounted to a vehicle, each of the plurality of radars having a different detection area outside the vehicle; and
    a controller generating object information for an object based on a radar signal reflected by the object within the detection area,
    wherein when the object moves from the detection area of at least one of the plurality of radars to a shadow area between different detection areas, the controller generates prediction information for the object in the shadow area based on object information last detected in the detection area,
    wherein the controller identifies a variation in distance, angle, or time of oft detection area based on a last detected position of the object leaving the detection area, identifies a change in the shadow area resulting m the variation in distance, angle, or the detection area, and generates the prediction information based on the changed shadow area.

2. The radar control device of claim 1, wherein when the object moves from the shadow area to the detection area of at least one of the plurality of radars, the controller generates the object information for the object based on the prediction information last generated for the shadow area.

3. The radar control device of claim 1, wherein the prediction information includes distance, angle, and speed information for the object predicted in the shadow area.

4. The radar control device of claim 1, wherein the controller generates a prediction data table for the shadow area based on the prediction information.

5. The radar control device of claim 4, wherein when the change in the shadow area is identified, the controller updates the prediction data table.

6. The radar control device of claim 5, wherein when the change in the shadow area is identified, the controller informs a driver of the vehicle the change of the shadow area.

7. The radar control device of claim 1, wherein when the object is detected in a region in which the detection areas of at least two of the plurality of radars overlap, the controller integrates the object information generated from each of the detection areas into one.

8. The radar control device of claim 7, wherein when the object moves from a detection area of a first radar of the plurality of radars to a detection area of a second radar, the controller controls to hand over the information for the object between the first radar and the second radar.

9. The radar control device of claim 1, wherein the controller stores the object information for the object and analyzes a driving pattern for the object based on the stored object information.

10. The radar control device of claim 9, wherein the controller generates the prediction information for the object in the shadow area by applying a driving pattern for the object.

11. A radar control method for controlling a plurality of radars mounted to a vehicle, each of the plurality of radars having a different detection area, the radar control device comprising:
    generating object information for an object based on a radar signal reflected by the object within the detection area;
    when the object moves from the detection area of at least one of the plurality of radars to a shadow area between different detection areas, generating prediction information for the object in the shadow area based on object information last detected in the detection area;
    identifying a variation in distance, angle, or time of the detection area based on a last detected position of the object leaving the detection area, and
    identifying a change in the shadow area resulting from the variation in distance, angle, or time of the detection area, and generating the prediction information based of the changed shadow area.

12. The radar control method of claim 11, further comprising, when the object moves from the shadow area to the detection area of at least one of the plurality of radars, generating the object information for the object based on the prediction information last generated for the shadow area.

13. The radar control method of claim 11, wherein the prediction information includes distance, angle, and speed information for the object predicted in the shadow area.

14. The radar control method of claim 11, further comprising generating a prediction data table for the shadow area based on the prediction information.

15. The radar control method of claim 14, further comprising, when the detection change in the shadow area is identified, updating the prediction data table.

16. The radar control method of claim 15, further comprising, when the change in the shadow area is identified, informing a driver of the vehicle the change of the shadow area.

17. The radar control method of claim 11, wherein generating the object information includes, when the object is detected in a region in which the detection areas of at least two of the plurality of radars overlap, integrating the object information generated from each of the detection areas into one.

18. The radar control method of claim 17, further comprising, when the object moves from a detection area of a first radar of the plurality of radars to a detection area of a second radar, controlling to hand over the information for the object between the first radar and the second radar.

19. The radar control method of claim 11, wherein generating prediction information includes, storing the object information for the object and analyzing a driving pattern for the object based on the stored object information.

20. The radar control method of claim 19, wherein generating prediction information includes, generating the prediction information for the object in the shadow area by applying a driving pattern for the object.

* * * * *